(12) United States Patent
Lee et al.

(10) Patent No.: US 11,080,900 B2
(45) Date of Patent: Aug. 3, 2021

(54) METHOD AND APPARATUS FOR METAL ARTIFACT REDUCTION IN INDUSTRIAL 3-DIMENSIONAL CONE BEAM COMPUTED TOMOGRAPHY

(71) Applicant: Korea Advanced Institute of Science and Technology, Daejeon (KR)

(72) Inventors: Chang-Ock Lee, Daejeon (KR); Soomin Jeon, Daejeon (KR); Seongeun Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/722,402

(22) Filed: Dec. 20, 2019

(65) Prior Publication Data

US 2021/0012544 A1     Jan. 14, 2021

(30) Foreign Application Priority Data

Jul. 8, 2019 (KR) .......................... 10-2019-0082057
Oct. 29, 2019 (KR) .......................... 10-2019-0134994

(51) Int. Cl.
*G06T 11/00* (2006.01)
*G06T 7/30* (2017.01)
*G06T 7/11* (2017.01)
*G06T 7/00* (2017.01)

(52) U.S. Cl.
CPC .......... *G06T 11/008* (2013.01); *G06T 7/0004* (2013.01); *G06T 7/11* (2017.01); *G06T 7/30* (2017.01); *G06T 11/006* (2013.01); *G06T 2207/10081* (2013.01); *G06T 2207/30108* (2013.01)

(58) Field of Classification Search
CPC . G06T 11/008; G06T 7/11; G06T 7/30; G06T 7/0004; G06T 11/006; G06T 2207/10081; G06T 2207/30108
See application file for complete search history.

(56) References Cited

U.S. PATENT DOCUMENTS 6,415,171 B1 *  7/2002  Gueziec ................. A61B 6/032
                                                              600/407
7,203,267 B2 *  4/2007  De Man ................ G06T 11/006
                                                              378/4

(Continued)

FOREIGN PATENT DOCUMENTS

KR    10-2001-0081097 A    8/2001
KR    10-2016-0004864 A    1/2016

*Primary Examiner* — Gregory M Desire

(74) *Attorney, Agent, or Firm* — McCormick, Paulding & Huber PLLC

(57) ABSTRACT

Provided is a method and apparatus for metal artifact reduction in industrial three-dimensional (3D) cone beam computed tomography (CBCT) that may align computer-aided design (CAD) data to correspond to CT data, generate registration data from the aligned CAD data, set a sinogram surgery region corresponding to a metal region based on the registration data, perform an average fill-in process on the CT data based on the registration data, update data of the sinogram surgery region based on the averaged filled-in information, and reconstruct a 3D CT image from the updated sinogram data with surgery region.

17 Claims, 13 Drawing Sheets

(56) References Cited

U.S. PATENT DOCUMENTS

| | | | |
|---|---|---|---|
| 7,747,305 B2* | 6/2010 | Dean | G16H 50/50 |
| | | | 600/407 |
| 8,705,832 B2* | 4/2014 | Vija | G06T 7/32 |
| | | | 382/131 |
| 8,792,702 B2* | 7/2014 | Kyriakou | A61B 6/5241 |
| | | | 382/131 |
| 9,672,641 B2* | 6/2017 | Abkai | G06T 7/0012 |
| 10,353,376 B2* | 7/2019 | Huang | G05B 19/4099 |
| 10,475,182 B1* | 11/2019 | Chilamkurhy | G06K 9/6284 |
| 10,520,453 B2* | 12/2019 | Monkawa | A61B 6/4021 |
| 2007/0014480 A1* | 1/2007 | Sirohey | G16H 30/40 |
| | | | 382/240 |
| 2018/0149471 A1 | 5/2018 | Lu et al. | |
| 2019/0104940 A1* | 4/2019 | Zhou | G06T 11/008 |

* cited by examiner

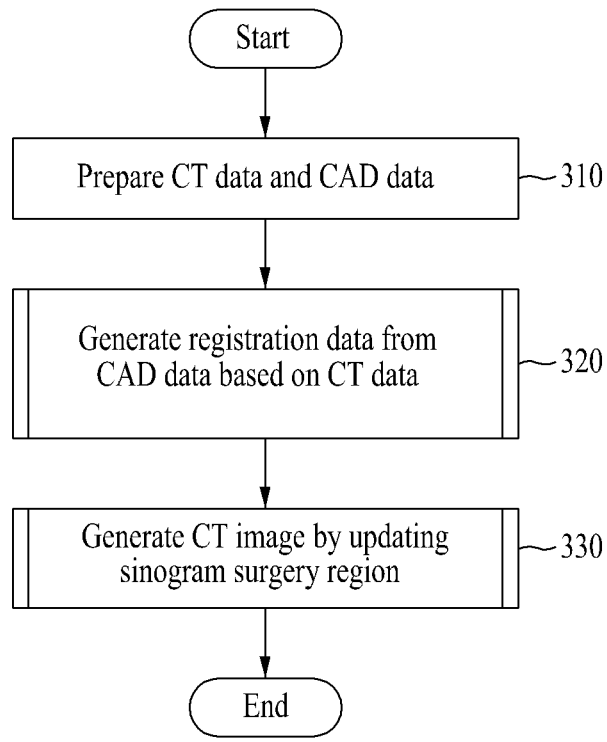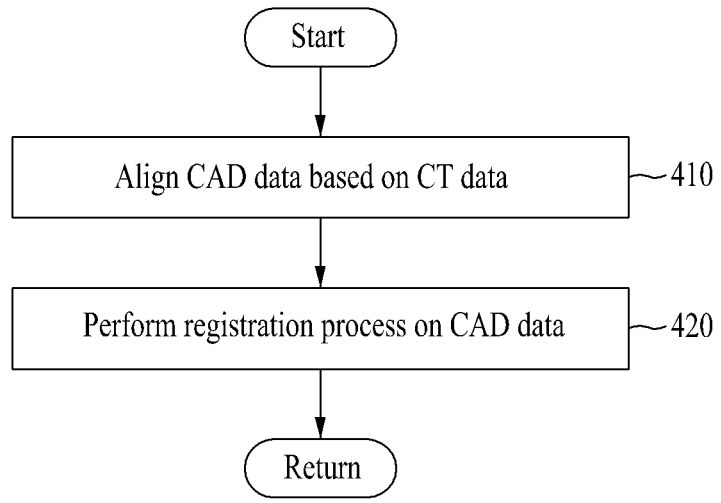

METHOD AND APPARATUS FOR METAL ARTIFACT REDUCTION IN INDUSTRIAL 3-DIMENSIONAL CONE BEAM COMPUTED TOMOGRAPHY

CROSS-REFERENCE TO RELATED APPLICATION

This application claims the priority benefit of Korean Patent Application Nos. 10-2019-0082057, filed on Jul. 8, 2019, and 10-2019-0314994, filed on Oct. 29, 2019, in the Korean Intellectual Property Office, the disclosure of which is incorporated herein by reference.

BACKGROUND

1. Field of the Invention

The following description of example embodiments relates to a method and apparatus for metal artifact reduction in industrial three-dimensional (3D) computed tomography (CT).

2. Description of the Related Art

Industrial X-ray computed tomography (CT) has been used in various industrial fields as an internal inspection for manufactures, such as, for example, flaw detection, failure analysis, metrology, and the like. Industrial CT provides internal information of a product regarding metallic and nonmetallic components, solid and fibrous materials, and smooth and irregularly surfaced objects. In particular, a reconstructed image obtained from three-dimensional (3D) cone beam CT (CBCT) provides ideal testing techniques to locate and measure volumetric details in three dimensions. However, a potential drawback with CT imaging is the possibility of artifacts in data due to a physical phenomenon, such as beam hardening effect. In general, X-ray CT systems employ a polychromatic beam and various components of an energy spectrum are not attenuated uniformly when passing through an object. A relatively lower energy component of an X-ray spectrum is more easily attenuated or even completely absorbed when travelling through a dense part. An image, which is reconstructed under the assumption that beam attenuation is linear, gives false information about material characteristics. This kind of phenomenon and the resulting artifacts are referred to as beam hardening effect and beam hardening artifacts, respectively. In particular, the beam hardening artifacts caused by metallic objects are called metal artifacts or streak artifacts depending on a cause and a shape pattern. Since the accuracy of product quality evaluation is directly related to the image quality, various methods are proposed to reduce the beam hardening artifacts.

A beam hardening, for example, metal artifact, reduction algorithm may be categorized into two approaches: a hardware based approach and a software based approach. The hardware based approach includes a physical filtering and a dual spectral system. However, the physical filtering degreases a signal to noise ratio (SNR) and the dual spectral system requires two times of scanning and there are also system limitations to be addressed. The software based approach includes image preprocessing and image postprocessing. Linearization in which polychromatic projection data is transformed to monochromatic projection data is one of the most common preprocessing correction methods. Postprocessing approaches are based on image segmentation and reprojection. However, the approaches do not sufficiently remove beam hardening, for example, artifacts due to metallic objects, and even generate secondary artifacts due to a reduction algorithm itself.

SUMMARY

Example embodiments provide an electronic device capable of removing metal artifacts in industrial three-dimensional (3D) cone beam computed tomography (CBCT), and an operation method of the electronic device.

According to an aspect of example embodiments, there is provided an operation method of an electronic device to remove metal artifacts in industrial 3D CBCT, the method including preparing CT data and computer-aided design (CAD) data; managing the registration data through alignment and registration of the CAD data into-the CT data; and generating a CT image by reconstructing a corrected sinogram, which is generated from the forward projection of the modified CT volume information processed with the registered CAD data.

According to another aspect of example embodiments, there is provided an electronic device, to remove metal artifacts in industrial 3D CBCT, the electronic device including a data preparation module configured to prepare CT data and CAD data; a registration module configured to register the CAD volume data into the CT volume data using by the aligning process; and a module configured to generate a CT image by reconstructing a corrected sinogram, which is generated from the forward projection of the modified CT volume information processed with the registered CAD data.

According to some example embodiments, an electronic device may remove metal artifacts in industrial 3D CBCT using the CAD data, which provide the shape information of CT volume. That is, the electronic device may remove the artifacts by registering the CAD data into the CT volume and by correcting the corrupted part of the sinogram data that causes the artifacts using segmentation information based on the registered CAD data, instead of directly correcting the CT data. Accordingly, the electronic device may further accurately and further effectively remove the metal artifacts in an industrial 3D CBCT image.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is a flowchart illustrating an operation method of an electronic device according to example embodiments;

FIG. 4 is a flowchart illustrating a registration data generation operation of FIG. 3;

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments.

Hereinafter, example embodiments will be described with reference to the accompanying drawings.

In the industry field, computer-aided design (CAD) data is available for an in-line inspection system since most products are designed in a form of CAD data before a manufacturing process.

Figure 1:
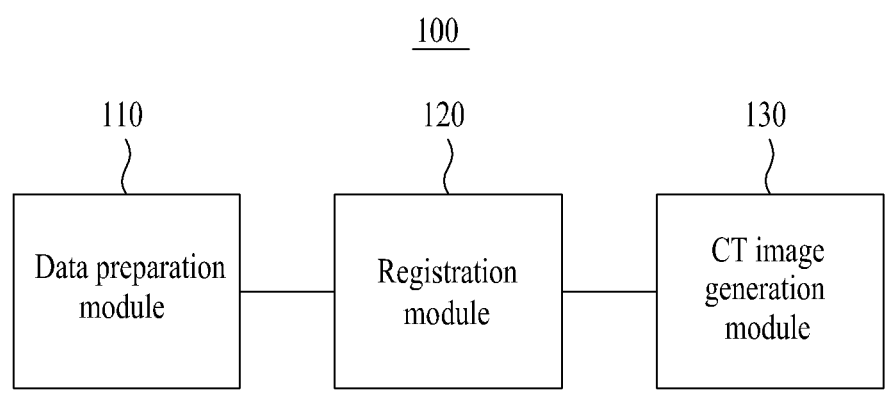
FIG. 1 is a diagram illustrating an electronic device according to example embodiments.
Figure 2:
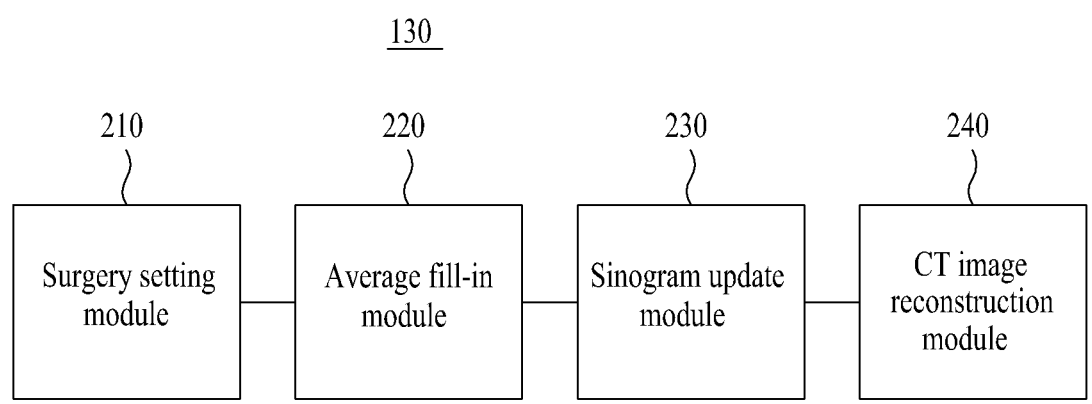
FIG. 2 is a diagram illustrating a computed tomography (CT) image generation module of FIG. 1.

FIG. 1 is a diagram illustrating an electronic device 100 according to example embodiments, and FIG. 2 is a diagram illustrating a computed tomography (CT) image generation module 130 of FIG. 1.

Referring to FIG. 1, the electronic device 100 may include a data preparation module 110, a volume data registration module 120, and the CT image generation module 130.

The data preparation module 110 may prepare CT data $V_{CT}$ and CAD data $V_{CAD}$ with respect to a specific object. The data preparation module 110 may remove noise in the CT data $V_{CT}$ and the CAD data $V_{CAD}$ to distinguish between the inside and the outside of an object. The data preparation module 110 may reconstruct the CT data $V_{CT}$ and the CAD data $V_{CAD}$ in a form of binary volume data by applying a threshold that is set based on a substance constituting the object. For example, the data preparation module 110 may reconstruct the CT data $V_{CT}$ using an anisotropic diffusion and shock filter.

The registration module 120 may transform the CAD data $V_{CAD}$ for registration into the CT data $V_{CT}$. That is, the registration module 120 may generate the registered CAD data based on the CT data $V_{CT}$. For example, the registration module 120 may generate registered CAD volume data from the original CAD data $V_{CAD}$ using a particle swarm optimization (PSO) algorithm. To this end, the registration module 120 may align the CAD data $V_{CAD}$ to correspond to the CT data $V_{CT}$. The registration module 120 may generate the registration data from the CAD data $V_{CAD}$. Here, the registration module 120 may adjust a volume and an angle of the CAD data $V_{CAD}$. For example, the registration module 120 may adjust the volume of the CAD data $V_{CAD}$ to correspond to a volume of the CT data $V_{CT}$ and may adjust the angle of the CAD data $V_{CAD}$ based on the CT data $V_{CT}$.

According to an example embodiment, the registration module 120 may generate the registered CAD volume data based on an initial criterion. In detail, the registration module 120 may perform a registration process on the CAD data $V_{CAD}$ and may obtain registration parameters as the initial criterion. Through this, the registration module 120 may generate the registered CAD data from the original CAD data $V_{CAD}$ based on the obtained registration parameters.

According to another example embodiment, the registration module 120 may generate registered CAD volume data from the original CAD data $V_{CAD}$ by performing a registration process according to two levels. In detail, the registration module 120 may obtain the registration parameters by downsampling the CAD volume data $V_{CAD}$ and by performing the registration process on the downsampled CAD data. Also, the registration module 120 may obtain the registered CAD volume data by performing the registration process on the original CAD data $V_{CAD}$ based on the registration parameters from the downsampled volume data. Through this, the registration module 120 may generate the registered CAD volume data from the original CAD data $V_{CAD}$ based on the registration parameters for the full volume data.

The CT image generation module 130 may correct sinogram data by using the registered CAD volume data and may remove metal artifacts from the corrected sinogram data. Referring to FIG. 2, the CT image generation module 130 may include a surgery setting module 210, an average fill-in module 220, a sinogram update module 230, and a CT image reconstruction module 240.

The surgery setting module 210 may set a sinogram surgery region based on the metal region in the registered CAD data. In detail, the surgery setting module 210 may generate the registered volume data by applying predetermined transformation parameters. The surgery setting module 210 may extract a metal region from the registered CAD data. Through this, the surgery setting module 210 may set the sinogram surgery region to correspond to the forward projected region of the metal region.

The average fill-in module 220 may perform an average fill-in process based on the registered CAD data. In detail, the average fill-in module 220 may segment the connected regions surrounding the metal region. The average fill-in module 220 may compute an average attenuation coefficient of each connected region. Through this, the average fill-in module 220 may fill in the metal region from the registration data using the average attenuation coefficient.

The sinogram update module 230 may update the sinogram surgery region using the modified CT data with the registered CAD data. That is, the sinogram update module 230 may update the sinogram surgery region using the registration data.

The CT image reconstruction module 240 may reconstruct a CT image using the updated sinogram surgery region. That is, the CT image reconstruction module 240 may reconstruct the CT image using the updated sinogram surgery region.

The electronic device 100 according to example embodiments may include the data preparation module 110 configured to prepare CT data and CAD data, the registration module 120 configured to generate the registered CAD volume data from the original CAD data based on the aligned CAD volume data, which matches to CT volume data, and the CT image generation module 130 configured to correct a sinogram from the registered CAD data and reconstruct an image based on the corrected sinogram.

According to example embodiments, the registration module 120 may be configured to adjust a size of CAD data to correspond to a volume of CT data and to adjust an angle of the CAD data based on the CT data.

According to example embodiments, the registration module 120 may be configured to obtain registration parameters by performing a registration process on CAD data and to generate the registered CAD data.

According to example embodiments, the registration module 120 may be configured to obtain the registration parameters by downsampling the CAD volume data and by performing a registration process on the downsampled CAD volume data.

According to example embodiments, the registration module 120 may be configured to obtain the registration parameters for the full volume CAD data by performing a registration process on CAD data based on the registration parameters of the downsampled CAD volume data and to generate the registered CAD volume data from the original CAD data based on the registration parameters for the full volume of CAD data.

According to example embodiments, the CT image generation module 130 may be configured to set a sinogram surgery region corresponding to a metal region based on registration data, to perform an average fill-in process based on the registration data, to update the sinogram surgery region, and to reconstruct a 3D CT image.

According to example embodiments, the CT image generation module 130 may be configured to obtain the registered data by applying a predetermined transformation parameters, and to set a surgery region that is influenced by a metal in a sinogram by extracting a metal region and by forward projecting the metal region based on the registered CAD data.

According to example embodiments, the CT image generation module 130 may be configured to segment the connected region surrounding the metal region, to compute an average attenuation coefficient of the connected regions, and to fill in the metal region using the average attenuation coefficient.

According to example embodiments, the data preparation module 110 may be configured to reconstruct CT data and CAD data in a format of binary volume data.

According to example embodiments, the registration module 120 may be configured to generate registration data of CAD data using a PSO algorithm.

FIG. 3 is a flowchart illustrating an example of an operation method of the electronic device 100 according to example embodiments.

Referring to FIG. 3, in operation 310, the electronic device 100 may prepare CT data $V_{CT}$ and CAD data $V_{CAD}$ with respect to a specific object. The data preparation module 110 may remove noise in the CT data $V_{CT}$ to distinguish the inside and the outside of an object. The data preparation module 110 may reconstruct the CT data $V_{CT}$ and the CAD data $V_{CAD}$ in a form of binary volume data by applying a threshold that is set based on a substance constituting the object. For example, the data preparation module 110 may reconstruct the CT data $V_{CT}$ using an anisotropic diffusion and shock filter.

In operation 320, the electronic device 100 may generate registration data from the CAD data $V_{CAD}$ based on the CT data $V_{CT}$. The registration module 120 may generate the registration data by transforming the CAD data $V_{CAD}$ for registration into the CT data $V_{CT}$. For example, the registration module 120 may generate registration data from CAD data $V_{CAD}$ using a PSO algorithm.

According to an example embodiment, the registration module 120 may generate the registered CAD data from the original CAD data $V_{CAD}$ based on an initial criterion. In detail, the registration module 120 may perform a registration process on the CAD data $V_{CAD}$ and may obtain registration parameters as the initial criterion. Through this, the registration module 120 may generate the registered CAD data of the original CAD data $V_{CAD}$ based on the registration parameters.

According to another example embodiment, the registration module 120 may generate the registered CAD data from the original CAD data $V_{CAD}$ by performing a registration process according to two levels. In detail, the registration module 120 may obtain the registration parameters by downsampling the original CAD data and by performing the registration process on the downsampled CAD data. Also, the registration module 120 may obtain the registration parameters for the full volume CAD data by performing the registration process on the original CAD data $V_{CAD}$ based on the registration parameters for the downsampled CAD data. Through this, the registration module 120 may generate registration data from the CAD data $V_{CAD}$ based on the registration parameters for the full volume CAD data.

FIG. 4 is a flowchart illustrating operation 320 of generating the registered CAD data of FIG. 3. FIGS. 5A, 5B, 5C, 5D, and 5E illustrate examples of describing operation 320 of generating registration of FIG. 3.

Figure 5A:
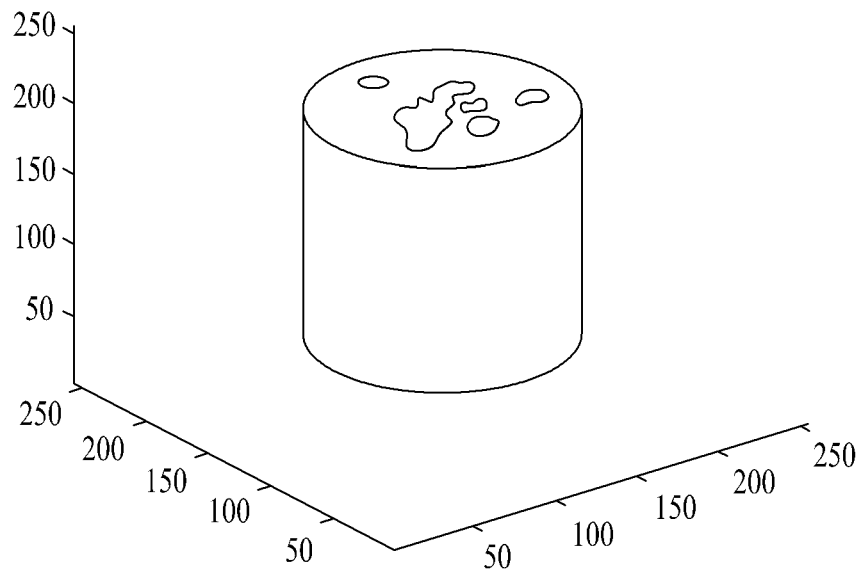
FIGS. 5A, 5B, 5C, 5D, and 5E illustrate examples of describing a registration data generating operation of FIG. 3.
Figure 5B:
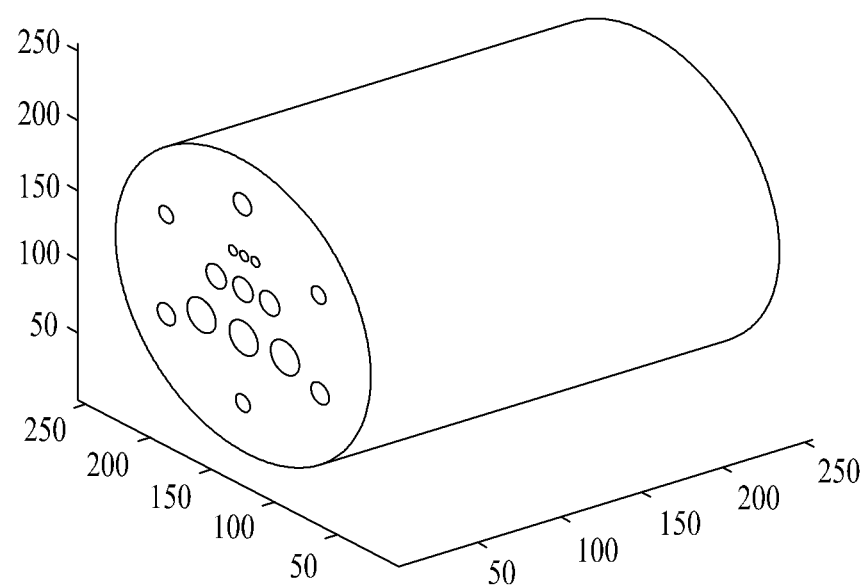
Figure 5C:
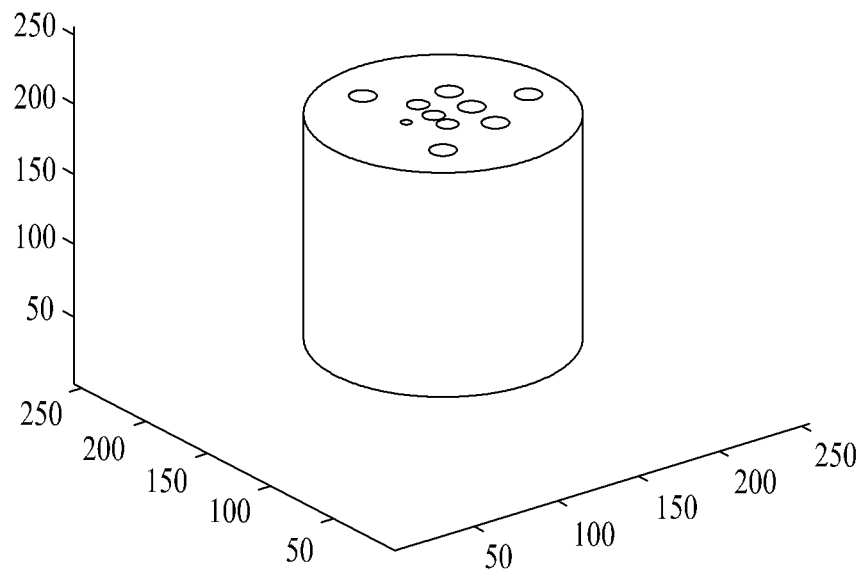
Figure 5D:
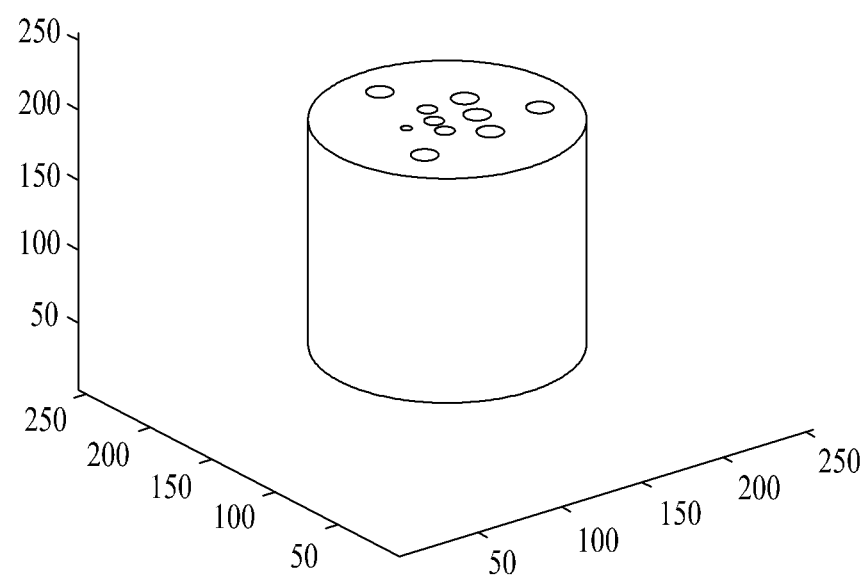
Figure 5E:
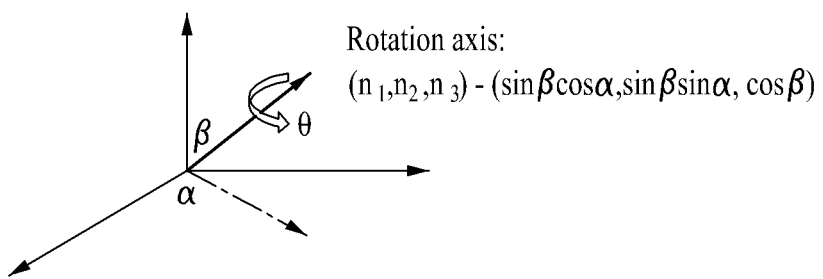

Referring to FIG. 4, in operation 410, the electronic device 100 may align the CAD data $V_{CAD}$ to correspond to the CT data $V_{CT}$. The registration module 120 may align the CAD data $V_{CAD}$ for registration into the CT data $V_{CT}$. For example, when the CT data $V_{CT}$ and the CAD data $V_{CAD}$ are prepared as shown in FIGS. 5A and 5B, respectively, the registration module 120 may align the CAD data $V_{CAD}$ as shown in FIG. 5C.

For example, for a 3D binary volume object V, an inertia tensor I may be defined by the moment of inertia $I_{xx}$, $I_{yy}$, and $I_{zz}$ and products of inertia $I_{xy}$, $I_{yz}$, and $I_{zx}$ as given by the following Equation 1. Here, the moment of inertia $I_{xx}$, $I_{yy}$, and $I_{zz}$ and the products of inertia $I_{xy}$, $I_{yz}$, and $I_{zx}$ may be defined by the following Equation 2. Here, since the inertia tensor I is symmetric, eigenvectors $v_1$, $v_2$, and $v_3$ of I may be principal axes of the 3D binary volume object V by a principal axis theorem. Here, eigenvalues $\lambda_1$, $\lambda_2$, and $\lambda_3$ may satisfy relation with the eigenvectors $v_1$, $v_2$, and $v_3$ as represented by the following Equation 3.

$$I = \begin{bmatrix} I_{xx} & -I_{xy} & -I_{xz} \\ -I_{yx} & I_{yy} & -I_{yz} \\ -I_{zx} & -I_{zy} & I_{zz} \end{bmatrix} \quad [\text{Equation 1}]$$

$$I_{xx} = \int_V (y^2 + z^2) dV,$$

$$I_{yy} = \int_V (z^2 + x^2) dV,$$

$$I_{zz} = \int_V (x^2 + y^2) dV,$$

$$I_{xy} = I_{yx} = -\int_V xy \, dV,$$

$$I_{yz} = I_{zy} = -\int_V yz \, dV,$$

$$I_{xz} = I_{zx} = -\int_V zx \, dV$$

[Equation 2]

$$Iv_i = \lambda_i v_i, \quad i = 1, 2, 3 \quad [\text{Equation 3}]$$

Based on Equation 3, for two 3D binary volume objects $V_1$ and $V_2$, a scaling ratio r between the two 3D binary volume objects $V_1$ and $V_2$ may be driven as represented by the following Equation 4. The scaling ratio r between the objects $V_1$ and $V_2$ may be represented as a scaling constant r.

$$\begin{cases} I_{xx}^{V_1} = \int_{V_1} (y^2 + z^2) dS \\ I_{xx}^{V_2} = \int_{V_2} ((ry)^2 + (rz)^2) r^3 dS \end{cases} \Rightarrow r^5 I_{xx}^{V_1} = I_{xx}^{V_2}, \quad [\text{Equation 4}]$$

$$r = \sqrt[5]{\frac{\lambda V_1}{\lambda V_1}}$$

Using matrices $Q_{CAD}$ and $Q_{CT}$ of principal axes and the scaling constant r, a transformation matrix Q for registration of CT data $V_{CT}$ and CAD data $V_{CAD}$, that is, to align the CAD data $V_{CAD}$ to correspond to the CT data $V_{CT}$ may be obtained as represented by the following Equation 5. Accordingly, using the transformation matrix Q, the registration module 120 may align the CAD data $V_{CAD}$ as represented by the following Equation 6, which may lead to generating the aligned CAD data $V_{align}$. Here, for registration into the CT data $V_{CT}$ as shown in FIG. 5A, the registration module 120 may align the CAD data $V_{CAD}$ as shown in FIG. 5B and may generate the aligned CAD data $V_{align}$ as shown in FIG. 5C.

$$Q = rQ_{CT}Q_{CAD}^{-1} = rQ_{CT}Q_{CAD}^{T} \quad \text{[Equation 5]}$$

$$V_{align} = QV_{CAD} \quad \text{[Equation 6]}$$

In operation 420, the electronic device 100 may generate the registered CAD data from the original CAD data $V_{CAD}$. For example, the registration module 120 may generate the registered CAD data from the original CAD data $V_{CAD}$. Here, the registration module 120 may obtain registration parameters by performing a registration process on the original CAD data $V_{CAD}$. The registration module 120 may perform the registration process using a PSO algorithm. The registration module 120 may generate the registered CAD data from the original CAD data $V_{CAD}$ based on the registration parameters. For example, referring to FIG. 5D, the registration module 120 may adjust the size of volume and an angle of the CAD data $V_{CAD}$ based on the alignment parameters and may generate the registration data accordingly. For example, the registration module 120 may adjust the volume size of the CAD data $V_{CAD}$ to correspond to a volume size of the CT data $V_{CT}$ and may adjust the angle of the CAD data $V_{CAD}$ based on the CT data $V_{CT}$.

For example, an energy function may be defined in advance as represented by the following Equation 7. Here, $\psi$ denotes a level set function of which a zero level set is a boundary of an object in an image I, i.e., the CAD data $V_{CAD}$, and $c_1$ and $c_2$ are constants, for example, scalar values. By minimizing Equation 7 in terms of the constants $c_1$ and $c_2$, the values may become the average intensities of the image I in regions in which $\psi$ is positive and negative, respectively. Here, since the image I is a 3D image, an Euler rotation of FIG. 5E may be considered. Based thereon, $\psi$ may be obtained from a reference level set function, for example, reference shape prior, $\psi_0$, as represented by Equation 8.

parameters based on the acquired $\psi$. Here, $\theta$ denotes a rotation angle with respect to a rotation axis n, (a, b, c) denotes a transformation parameters, for example, a translation factor along x, y, and z axes, respectively, and ($n_1$, $n_2$, $n_3$) denotes a unit normal vector of the rotation axis. Through this, the registration module 120 may generate the registered CAD volume data from the original CAD data $V_{CAD}$ based on the registration parameters. For example, the registration module 120 may adjust a volume size and an angle of the CAD data $V_{CAD}$ based on the registration parameters.

TABLE 1

Alogorithm Finding a minimizer of E

1: An initial level set $\psi$ for aligned prior is given.
2: for k = 1, 2, 3, . . .
3:    Update $c_1$, $c_2$ using $$c_1 = \frac{\int_\Omega I(x) H(\psi) dx}{\int_\Omega H(\psi) dx} \text{ and } c_2 = \frac{\int_\Omega I(x)(1 - H(\psi)) dx}{\int_\Omega 1 - H(\psi) dx}.$$

Figure 6:
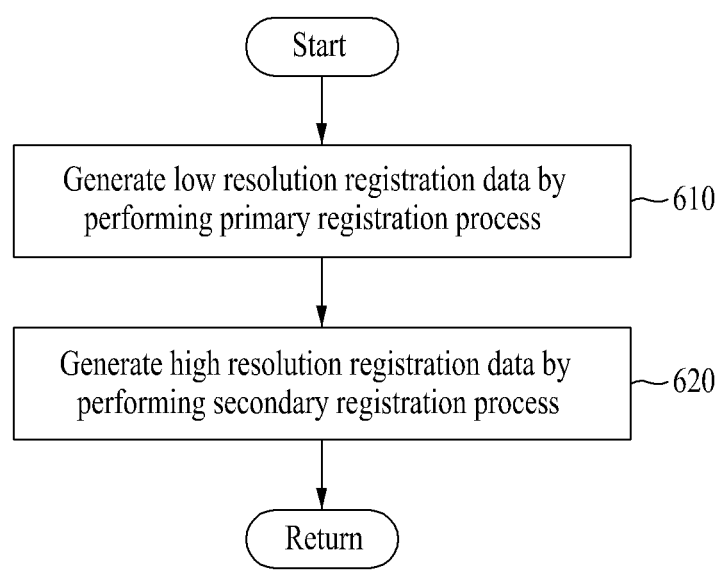
FIG. 6 is a flowchart illustrating a registration data generating operation of FIG. 3.

4:    For fixed $c_1$, $c_2$, update $\theta$.
5:    For fixed $c_1$, $c_2$, $\theta$, update (a, b, c).
6:    For fixed $c_1$, $c_2$, $\theta$, (a, b, c), update normalized ($n_1$, $n_2$, $n_3$).
7: end FIG. 6 is a flowchart illustrating operation 320 of generating registration data of FIG. 3. FIGS. 7A, 7B, and 7C and FIGS. 8A, 8B, and 8C illustrate operation 320 of generating registered CAD volume data in the operation of FIG. 3.

Figure 7A:
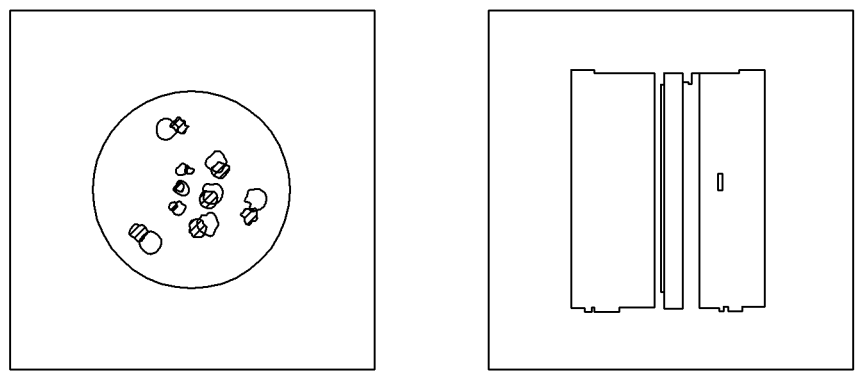
FIGS. 7A, 7B, and 7C and FIGS. 8A, 8B, and 8C illustrate examples of describing a registration data generation operation of FIG. 3.
Figure 7B:
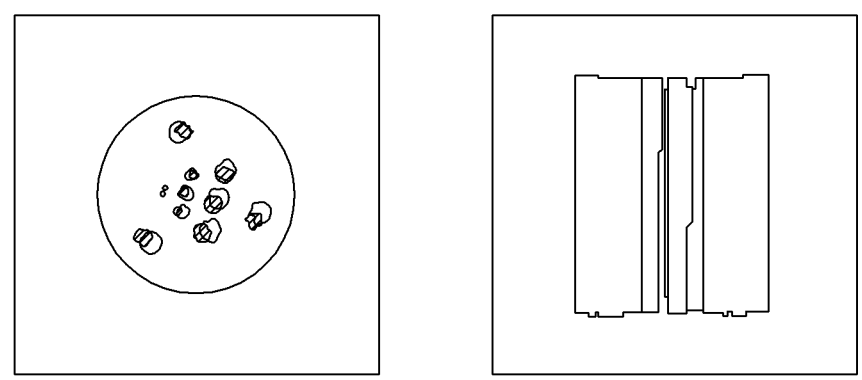
Figure 7C:
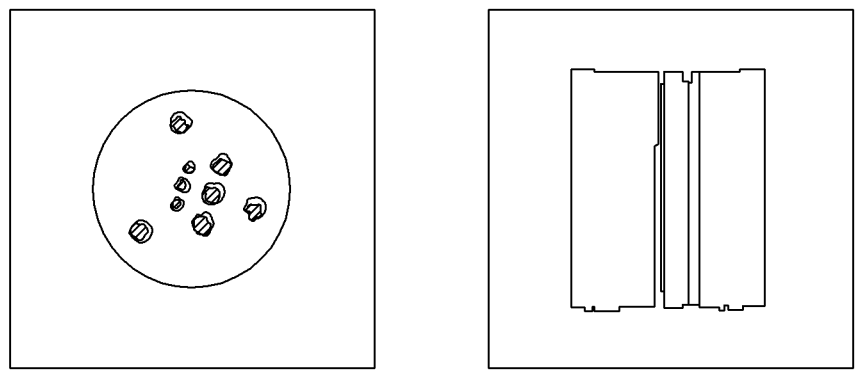

Referring to FIG. 6, in operation 610, the electronic device 100 may perform a primary registration process. Referring to FIG. 7A, the registration module 120 may generate CAD data $V_{CAD}$. The registration module 120 may adjust a volume and an angle of the CAD data $V_{CAD}$ as shown in FIG. 7B and may generate the registration parameters for the downsampled CAD data as shown in FIG. 7C. To this end, the registration module 120 may perform the primary registration process using a PSO algorithm.

For example, the registration module 120 may perform the primary registration process using an algorithm represented as the following Table 2. The registration module 120 may downsample the CAD data $V_{CAD}$. Here, when the CAD data $V_{CAD}$ has a size of (n×n×n), a size of the downsampled CAD data $V_{CAD}$ may be (n/2×n/2×n/2). The registration module 120 may obtain the registration parameters for the downsampled CAD volume by performing a registration process on the downsampled CAD data. Here, the registration parameters for the downsampled data may be acquired using the values given in the following Table 3.

$$E(\psi, c_1, c_2) = \int_\Omega (I - c_1)^2 H(\psi) dx + \int_\Omega (I - c_2)^2 (-H(\psi)) dx \quad \text{[Equation 7]}$$

$$\psi = \psi_0 \begin{bmatrix} (x-a)(n_1^2(1-\cos\theta) + \cos\theta) + (y-b)(n_1n_2(1-\cos\theta) - n_3\sin\theta) + (z-c)(n_1n_3(1-\cos\theta) + n_2\sin\theta) \\ (x-a)(n_1n_2(1-\cos\theta) + n_3\sin\theta) + (y-b)(n_2^2(1-\cos\theta) + \cos\theta) + (z-c)(n_2n_3(1-\cos\theta) - n_1\sin\theta) \\ (x-a)(n_1n_3(1-\cos\theta) - n_2\sin\theta) + (y-b)(n_2n_3(1-\cos\theta) + n_1\sin\theta) + (z-c)(n_3^2(1-\cos\theta) + \cos\theta) \end{bmatrix} \quad \text{[Equation 8]}$$

Figure 8A:
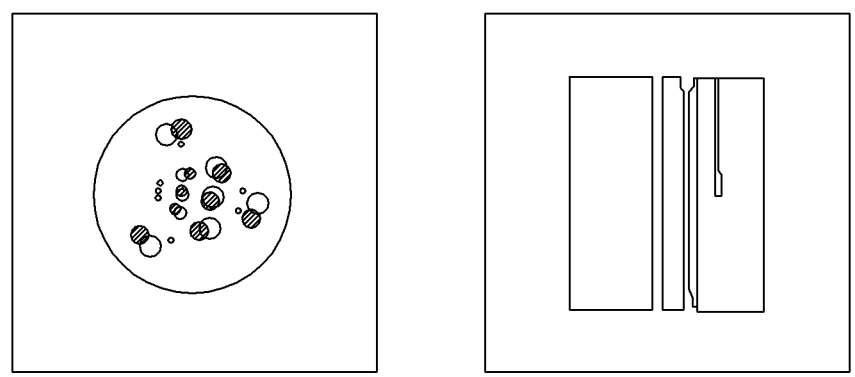
Figure 8B:
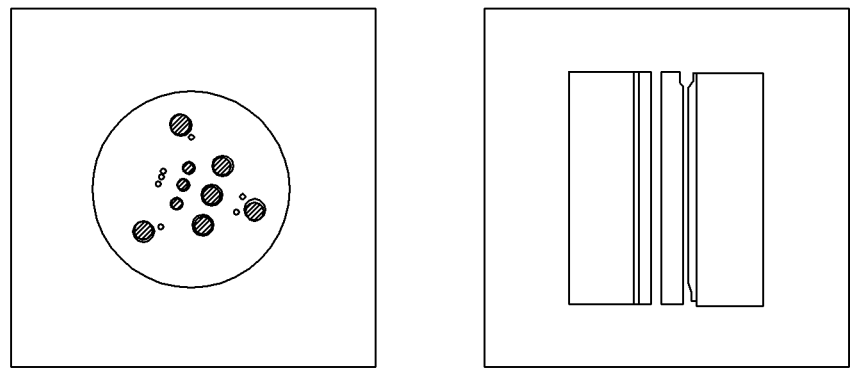
Figure 8C:
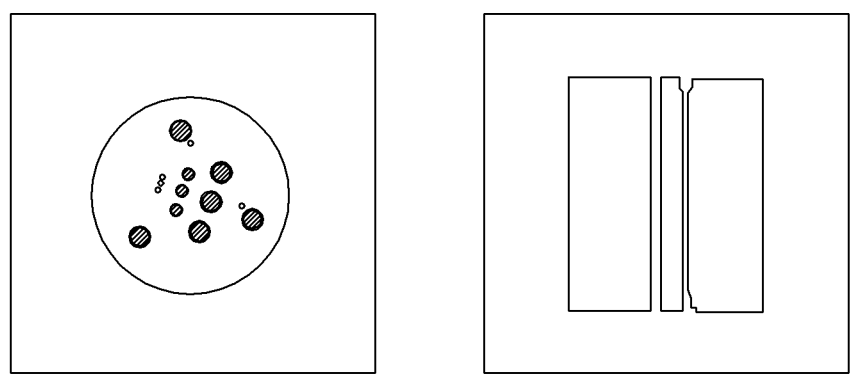

For example, the registration module 120 may obtain registration parameters according to an algorithm represented as the following Table 1. The registration module 120 may obtain $\theta$, (a, b, c), and ($n_1$, $n_2$, $n_3$) as the registration In operation 620, the electronic device 100 may perform a secondary high resolution registration. The registration module 120 may align the original CAD volume data based on the registration parameters obtained from the primary registration process as shown in FIG. 8A, and may generate the registered CAD volume data for the full CAD volume data as shown in FIG. 8C by adjusting the position of the aligned CAD volume data as shown in FIG. 8B. To this end, the registration module 120 may perform the secondary high resolution registration process using the PSO algorithm.

For example, the registration module 120 may perform the secondary high resolution registration process according to an algorithm represented by the following Table 2. The registration module 120 may obtain the registration parameters for the full volume CAD data by performing the registration process on the original CAD data $V_{CAD}$ based on registration parameters for the downsampled CAD data. Here, the registration parameters for the full volume CAD data may be obtained using the values given in the following Table 3. Through this, the registration module 120 may generate registered CAD data for the full volume CAD data, that is, final registration data from the CAD data $V_{CAD}$ based on the registration parameters for the full volume CAD data.

TABLE 2

Algorithm Two resolution approach
1: Initial binary data Ψ, Φ are given.
2: Find the alignment matrix Q using Ψ, Φ.
3: Generate downsampled data ψ, ϕ from Ψ, Φ.
4: <Step 1> Apply Algorithm 2 to Qψ with ϕ.
5: <Step 2> Apply Algorithm 2 to QΨ with Φ using the resulting parameters of <Step 1> as initial parameters.

Φ, Ψ: n × n × n data
ϕ, ψ: ½n × ½n × ½n data

TABLE 3

| | θ | (a, b, c) | n = (n₁, n₂, n₃) |
|---|---|---|---|
| <Step 1> | | | |
| initial seeds | ∠(v$_{1,center}$,v₁, v$_{1,center}$,v₂) | (0,0,0) | first principal axis |
| range of seed distribution | 2° | (0.5, 0.5, 0.5) | (0.1, 0.1, 0.1) |
| number of seed | 10 | 30 | 20 |
| inner iter. stop criteria | $\|θ^n - θ^{n-1}\| < 10^{-5}$ | $\|(a, b, c)^n -$ $(a, b, c)^{n-1}\| < 10^{-5}$ | $∠(n^n, n^{n-1}) <$ $10^{-4}$ |
| <Step 2> | | | |
| initial seeds | resulting parameter of <Step 1> | | |
| range of seed distribution | 1° | (0.2, 0.2, 0.2) | (0.05, 0.05, 0.05) |
| number of seed | 5 | 10 | 7 |
| inner iter. stop criteria | $\|θ^n - θ^{n-1}\| < 10^{-5}$ | $\|(a, b, c)^n -$ $(a, b, c)^{n-1}\| < 10^{-5}$ | $∠(n^n, n^{n-1}) <$ $10^{-4}$ |

Accordingly, the registration data may be registered for the CT data $V_{CT}$, as represented by the following Table 4. The registration module 120 may align the original CAD data $V_{CAD}$ to correspond to the CT data $V_{CT}$ and accordingly, the CAD data $V_{CAD}$ may be registered into the CT data $V_{CT}$. Also, the registration module 120 may generate the registration data from the CAD data $V_{CAD}$ and accordingly, the registration data may be further registered into the CT data $V_{CT}$.

TABLE 4

| | Initial state | Alignment result | Registration result |
|---|---|---|---|
| L2 relative error | 1.6761 | 0.3498 | 0.1687 |
| Absolute relative error | 2.8092 | 0.1224 | 0.0285 |

TABLE 4-continued

| | Initial state | Alignment result | Registration result |
|---|---|---|---|
| MSE | 0.3684 | 0.0161 | 0.0037 |
| PSNR | 4.3364 | 17.9447 | 24.2781 |
| SSIM | 0.5010 | 0.9389 | 0.9732 |

In operation 330, the electronic device 100 may generate a CT image. The CT image generation module 130 may remove metal artifacts using the registration data.

Figure 9:
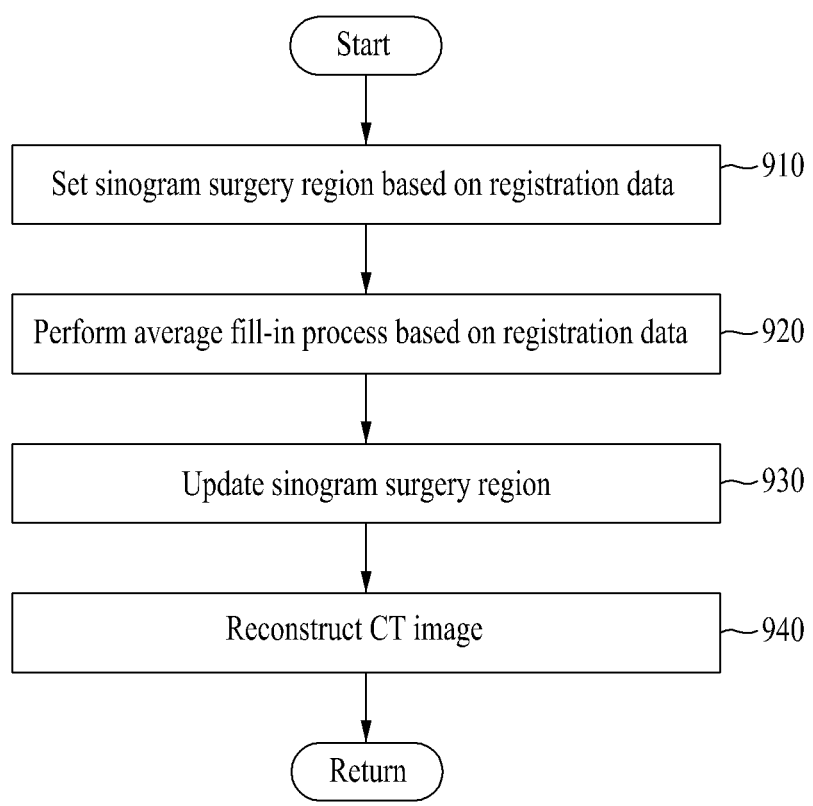
FIG. 9 is a flowchart illustrating a CT image generating operation of FIG. 3.
Figure 10A:
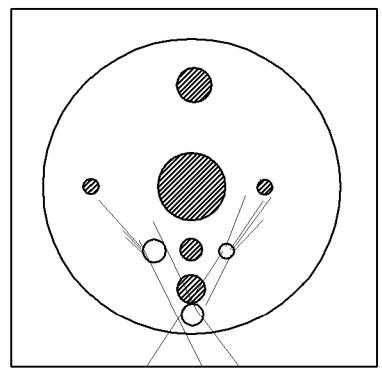
FIGS. 10A and 10B illustrate examples of describing a CT image generating operation of FIG. 3.
Figure 10B:
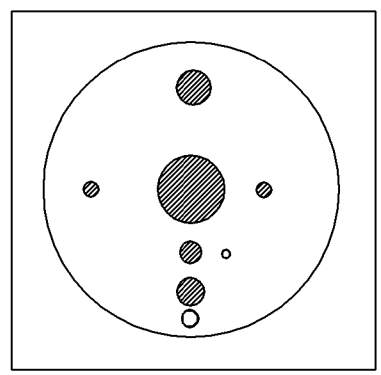

FIG. 9 is a flowchart illustrating operation 330 of generating a CT image of FIG. 3, and FIGS. 10A and 10B illustrate examples of describing operation 330 of generating a CT image of FIG. 3.

Referring to FIG. 9, in operation 910, the electronic device 100 may set a sinogram surgery region for the sinogram, which is obtained by forward projection of the CT volume data, obtained from the average fill-in process using the registered CAD data. The surgery setting module 210 may generate the registration data by applying predetermined transformation parameters as represented by the following Equation 9. The surgery setting module 210 may extract a metal region from the generated registration data as represented by the following Equation 10. Through this, the surgery setting module 210 may set the sinogram surgery region corresponding to the metal region, as expressed by the following Equation 11. For example, the surgery setting module 210 may set the sinogram surgery region from the registration data as shown in FIG. 10A.

$$f^{(0)} = \mathcal{R}^{-1}S^{(0)} \quad \text{[Equation 9]}$$

In Equation 9, $S^{(0)}$ denotes initial sinogram data, $\mathcal{R}^{-1}$ denotes an operator that represents reconstruction of an image, and $f^{(0)}$ denotes an image reconstructed from initial sinogram in which metal artifacts appear.

$$f^{(0)}: M, \text{ Extract } M \text{ from } f^{(0)} \quad \text{[Equation 10]}$$

In Equation 10, M denotes a metal region.

$$\mathcal{M} = \text{supp}(\mathcal{R}_\chi \mathcal{M}) \quad \text{[Equation 11]}$$

In Equation 11, supp($\mathcal{R}_\chi \mathcal{M}$) denotes a sinogram surgery region.

Through operations 920, 930, and 940, the electronic device 100 may perform an iterative update on the registration data and the sinogram surgery region. To this end, the update of the sinogram surgery region may be defined as given by the following Equation 12.

$$\text{For } n=1,2,3,\ldots, (\text{do while } \|S^{(n)}-S^{(n-1)}\|/\|S^{(n-1)}\| < Tol) \quad \text{[Equation 12]}$$

In operation 920, the electronic device 100 may perform an average fill-in process based on the registration data. The average fill-in module 220 may segment the connected regions surrounding the metal region. The average fill-in module 220 may compute an average attenuation coefficient, for example, an average intensity value from the connection regions. Through this, the average fill-in module 220 may fill in the metal region of the registration data using the average attenuation coefficient.

$$f^{(n-1)}v^{(n-1)}\chi_{C \cup M} + f^{(n-1)}(1-\chi_{C \cup M}) \quad \text{[Equation 13]}$$

In Equation 13, $f^{(n-1)}$ denotes an (n−1)-th reconstructed CT image, C denotes connected regions, and $v^{(n-1)}$ denotes the average attenuation coefficient.

In operation 930, the electronic device 100 may update the sinogram surgery region. The sinogram update module

230 may update the sinogram surgery region for the sinogram, which is obtained by forward projection of the CT volume data, obtained from the average fill-in process using the registered CAD data as represented by the following Equation 14. That is, the sinogram update module 230 may correct the sinogram surgery region based on the registration data.

$$\tilde{S}^{(n-1)} = \mathcal{R} \tilde{f}^{(n-1)},$$

$$S^{(n)} = \tilde{S}^{(n-1)} \chi_{\mathcal{M}} + S^{(0)}(1 - \chi_{\mathcal{M}})$$ [Equation 14]

In operation 940, the electronic device 100 may reconstruct a CT image from the updated sinogram surgery region. The CT image reconstruction module 240 may reconstruct the CT image using the updated sinogram surgery region as represented by the following Equation 15. That is, the CT image reconstruction module 240 may reconstruct the CT image based on the updated sinogram surgery region. For example, the CT image reconstruction module 240 may obtain the reconstructed CT image as shown in FIG. 10B.

$$f^{(n)} = \mathcal{R}^{-1} S^{(n)}$$ [Equation 15]

An operation method of the electronic device 100 according to example embodiments may include an operation of preparing CT data and CAD data, an operation of generating registration data from the CAD data by aligning the CAD data, and an operation of correcting sinogram data.

According to example embodiments, the operation of generating CAD data may include an operation of adjusting a volume size of the CAD data to correspond to a volume of the CT data and adjusting an angle of the CAD data based on the CT data.

According to example embodiments, the operation of generating registered CAD data may include an operation of obtaining registration parameters by performing a registration process on the original CAD data and an operation of generating the registration data from the original CAD data.

According to example embodiments, the operation method of the electronic device 100 may further include an operation of downsampling the CAD data and an operation of obtaining the registration parameters for the downsampled CAD volume by performing the registration process on the downsampled CAD data.

According to example embodiments, the operation of generating registration data may further include an operation of obtaining registration parameters for the full volume CAD data by performing the registration process on the CAD data based on the registration parameters for the downsampled CAD data and an operation of generating the registered CAD data from the original CAD data based on the registration parameters for the full volume CAD data.

According to example embodiments, the operation of correcting the sinogram data may include an operation of setting a sinogram surgery region corresponding to a metal region based on the registered CAD data, an operation of performing an average fill-in process based on the registration data, an operation of updating the sinogram surgery region, and an operation of reconstructing the CT image.

According to example embodiments, the operation of setting the sinogram surgery region may include an operation of generating the registered CAD volume data by applying predetermined transformation parameters, an operation of extracting the metal region from the registration data, an operation of setting the sinogram surgery region to correspond to the metal region.

According to example embodiments, the operation of performing the average fill-in process may include an operation of segmenting the registration data into connected regions surrounding the metal region, an operation of computing an average attenuation coefficient from the connected regions, and an operation of filling in the metal region using the average attenuation coefficient.

According to example embodiments, the operation of preparing CT data and CAD data may include an operation of generating the CT data and the CAD data in a format of binary volume data.

According to example embodiments, the operation of generating registration data may include an operation of generating the registered CAD data from the original CAD data using a PSO algorithm.

According to example embodiments, the electronic device 100 may remove metal artifacts in industrial 3D CT using CAD data. According to example embodiments, the electronic device 100 may remove artifacts from registration data as shown in FIG. 10A, and accordingly, may obtain the reconstructed CT image as shown in FIG. 10B. That is, instead of directly correcting the CT data, the electronic device 100 may generate the registration data from the CAD data for registration into the CT data, and may remove the artifacts through the average fill-in process and sinogram surgery using the registration data. Accordingly, the electronic device 100 may further effectively remove the metal artifacts in the industrial 3D CT.

FIGS. 11A, 11B, 11C, 11D, and 11E illustrate examples of describing an operation effect of the electronic device 100 according to example embodiments.

Figure 11A:
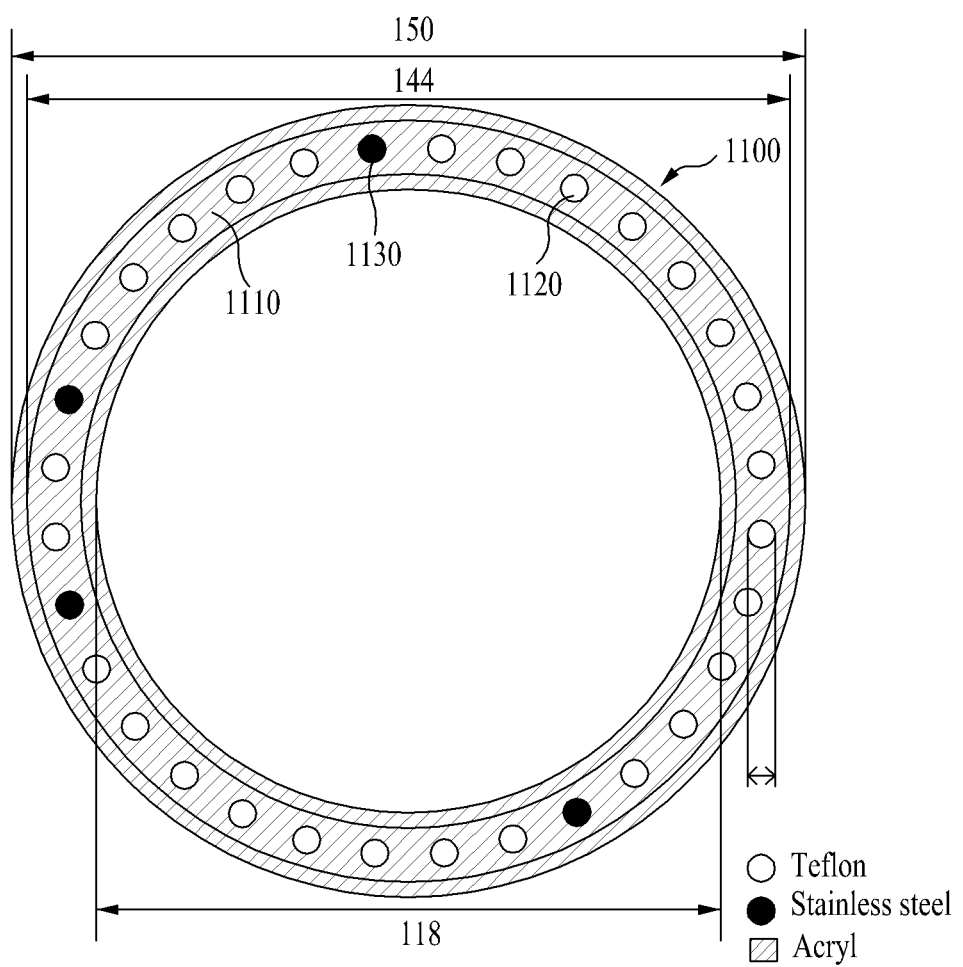
FIGS. 11A, 11B, 11C, 11D, and 11E illustrate examples of describing an operation effect of an electronic device according to example embodiments.

Referring to FIG. 11A, an object 1100 for deriving an operation effect of the electronic device 100 according to example embodiments may be prepared. The object 1100 may include a body 1110 in a ring shape and a plurality of elements 1120 and 1130 configured to insert into the body 1110 along the ring shape of the body 1110. The plurality of elements 1120 and 1130 may be spaced apart from each other at desired intervals and may insert into the body 1110 in a circular shape. For example, an outer diameter of the body 1110 may be 150 mm, an inner diameter of the body 1110 may be 118 mm, and the diameter of each of the elements 1120 and 1130 may be 5 mm. The plurality of elements 1120 and 1130 may include a plurality of first elements 1120 and a plurality of second elements 1130 provided between the first elements 1120. Here, the body 1110 and the first elements 1120 may be formed of a non-metal material and the second elements 1130 may be formed of a metal material. For example, the body 1110 may include acryl, the first elements 1120 may include Teflon, and the second elements 1130 may include stainless steel.

Figure 11B:
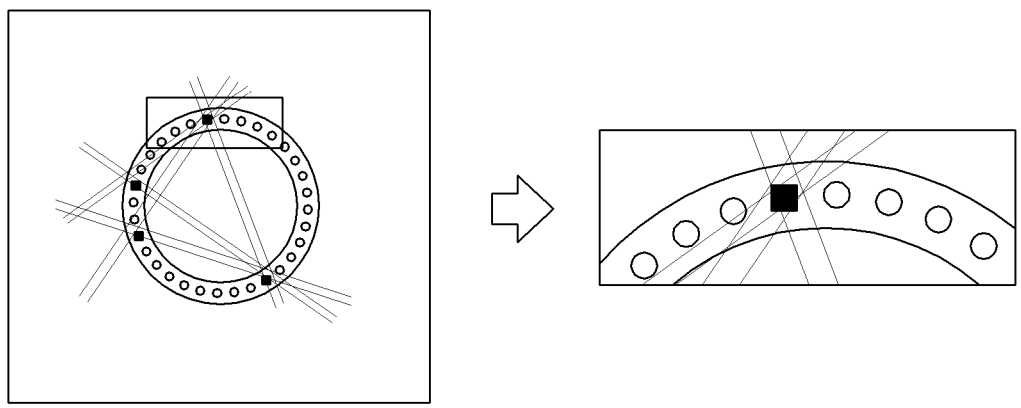
Figure 11C:
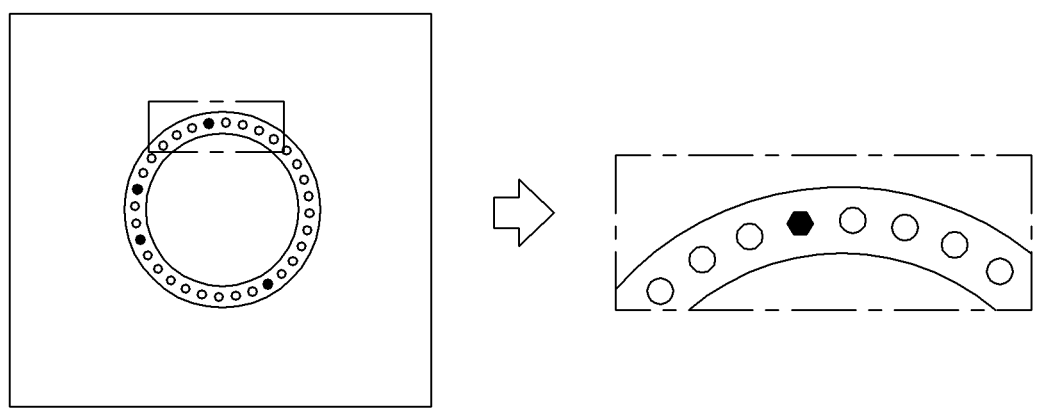
Figure 11D:
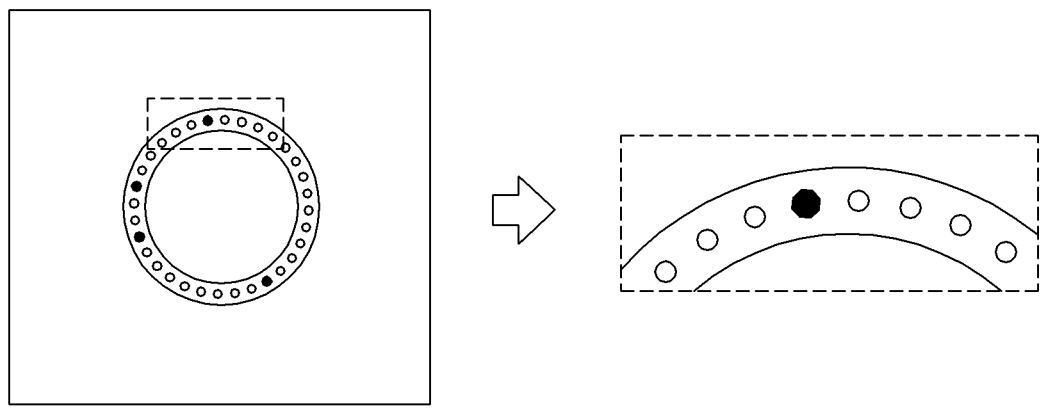
Figure 11E:
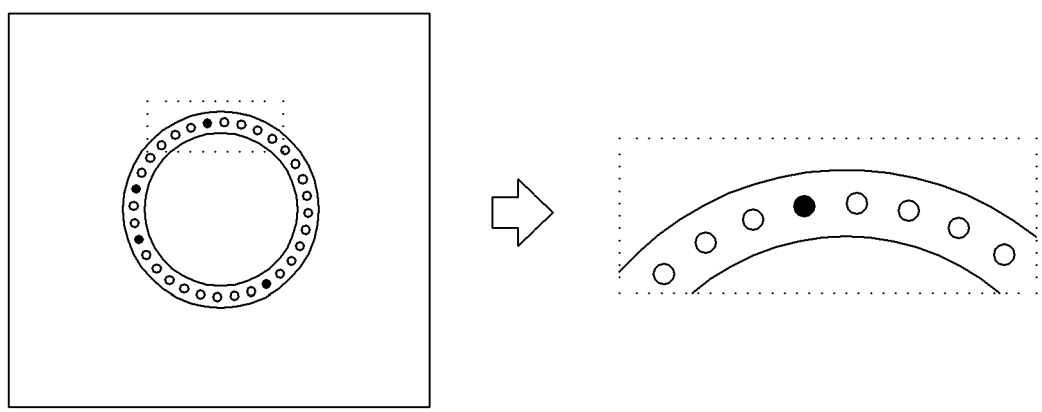

Referring to FIG. 11B, a CT image of the object 1100 may be obtained. Here, artifacts corresponding to the second element 1130 may be included in the CT image. Since the second element 1130 is formed of a metal material, artifacts may occur due to the second element 1130. If a general algorithm, for example, a normalized metal artifact reduction (NMAR) is applied to reduce the artifacts, the CT image of the object 1100 may be obtained as shown in FIG. 11C. Also, the CT image of the object 1100 as shown in FIG. 11D or 11E may be obtained using the electronic device 100 according to example embodiments. Here, if the registered CAD data from the electronic device 100 is not used to find the fill-in region and metal region, the CT image may be obtained as shown in FIG. 11D. On the contrary, if the registered CAD data is used, the CT image may be obtained as shown in FIG. 11E.

Comparing FIGS. 11B and 11C, although the general algorithm is applied, artifacts included in the CT image of the object 1100 may be slightly reduced. Here, comparing FIG. 11C and FIGS. 11D and 11E, artifacts included in the CT image of the object 1100 may be significantly reduced using the electronic device 100 according to example embodiments. Referring to FIGS. 11D and 11E, since the electronic device 100 uses the registered CAD data, artifacts included in the CT image of the object 1100 may be further significantly reduced.

Herein, an electronic device according to the example embodiments may be various types of devices. The electronic device may include, for example, a portable communication device (e.g., a smartphone), a computer apparatus, a portable multimedia device, a portable medical device, a camera, a wearable device, and home appliances. The electronic device is not limited to the aforementioned devices.

The example embodiments and the terms used herein are not construed to limit the disclosure to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B", "at least one of A and/or B", "A, B, or C", "at least one of A, B, and/or C", and the like may include any possible combinations of listed items. Terms "first", "second", "third", etc., are used to describe various components and the components should not be limited by the terms. The terms are simply used to distinguish one component from another component. When a component, for example, a first component, is described to be "(functionally or communicatively) connected to" or "accessed to" another component, for example, a second component, the component may be directly connected to the other component or may be connected through still another component, for example, a third component.

The term "module" used herein may include a unit configured as hardware, software, or firmware, and may be interchangeably used with the terms "logic", "logic block", "part", "circuit", etc. The module may be an integrally configured part, a minimum unit that performs at least function, or a portion thereof. For example, the module may be configured as an application-specific integrated circuit (ASIC).

The example embodiments may be configured as software including one or more instructions stored in a non-transitory computer-readable storage medium by a machine, for example, the electronic device 100. For example, a processor of a device may call at least one instruction among the one or more instructions stored in the storage medium and may execute the instruction. This enables the device to perform at least one function in response to the called at least one instruction. The one or more instructions may be executed by a code created by a compiler or an interpreter. The computer-readable storage medium may be provided in a form of a non-transitory storage medium. Here, "non-transitory" simply indicates that the storage medium is a tangible device and a signal (e.g., electromagnetic wave) is not included. This term does not distinguish a case in which data is semi-permanently stored in the storage medium and a case in which data is temporarily stored.

According to the example embodiments, each of the components (e.g., module or program) may include a singular object or a plurality of objects. According to the example embodiments, at least one of the components or operations may be omitted. Alternatively, at least one another component or operation may be added. Alternatively or additionally, a plurality of components (e.g., module or program) may be integrated into a single component. In this case, the integrated component may perform one or more functions of each of the components in the same or similar manner as it is performed by a corresponding component before integration. According to the example embodiments, operations performed by a module, a program, or another component may be performed in sequential, parallel, iterative, or heuristic manner. Alternatively, at least one of the operations may be performed in different sequence or omitted. Alternatively, at least one another operation may be added.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operation method of an electronic device, the method comprising:
   generating registered computer-aided design (CAD) volume data, which matches to computed tomography (CT) volume data, based on prepared CT data and prepared CAD data;
   generating a CT image by updating a sinogram surgery region based on the registration data;
   downsampling the CAD data; and
   obtaining the registration parameters for the downsampled data by performing a registration process on the downsampled CAD data.

2. The method of claim 1, wherein the generating of the registration data comprises:
   adjusting a volume of the CAD data to correspond to a CT volume data; and
   adjusting an angle of the CAD data based on the CT data.

3. The method of claim 1, wherein the generating of the registration data comprises:
   obtaining registration parameters by performing a registration process on the CAD data; and
   generating the registered CAD data based on the registration parameters.

4. The method of claim 1, wherein the generating of the registration data comprises obtaining the registration parameters for the full volume data by performing the registration process on the CAD data based on the registration parameters for the downsampled data; and
   generating the registration data from the CAD data based on the registration parameters for the full volume data.

5. The method of claim 1, wherein the generating of the CT image comprises:
   setting a sinogram surgery region corresponding to a metal region based on forward projected part of the registered CAD volume data;
   performing an average fill-in process based on the registered CAD volume data;
   updating the sinogram surgery region; and
   reconstructing the CT image.

6. The method of claim 5, wherein the setting of the sinogram surgery region comprises:
reconstructing the registration data by applying predetermined transformation parameters;
extracting a metal region from the registration data; and
setting the sinogram surgery region by forward projecting the extracted metal region.

7. The method of claim 5, wherein the performing of the average fill-in process comprises:
segmenting the connected regions surrounding the metal region using the registration result;
computing an average attenuation coefficient of the connected regions; and
filling in each connected region using the average attenuation coefficients.

8. The method of claim 1, wherein the generating of the registration data comprises generating the registered CAD volume data from the CAD data using a particle swarm optimization (PSO) algorithm.

9. The method of claim 1, wherein the generating of the registration data comprises:
generating the registration data based on the CAD data by adjusting at least one of a volume or an angle of the CAD data with regards to the CT data.

10. An electronic device comprising:
a registration module configured to register computer-aided design (CAD) data by aligning prepared CAD data to prepared computed tomography (CT) data; and
a module configured to generate a CT image based on the registration data;
wherein the registration module is further configured to downsample the CAD data, and to obtain the registration parameters for the downsampled data by performing a registration process on the downsampled CAD data.

11. The electronic device of claim 10, wherein the registration module is further configured to adjust a CAD volume data to correspond to a volume of the CT data and to adjust an angle of the CAD data based on the CT data.

12. The electronic device of claim 10, wherein the registration module is further configured to obtain registration parameters by performing a registration process on the CAD data, and to generate the registered CAD data from the given CAD data based on the registration parameters.

13. The electronic device of claim 10, wherein the registration module is further configured to obtain the registration parameters for the full volume data by performing the registration process on the CAD data based on the registration parameters for the downsampled volume data, and to generate the registered CAD data using the registration parameters obtained from the full volume data.

14. The electronic device of claim 10, wherein the module configured to generate the CT image is further configured to set a sinogram surgery region corresponding to a metal region based on the registration data, by forward projection of the registered metal region, to perform an average fill-in process based on the registration data, to update the sinogram surgery region, and to reconstruct the CT image.

15. The electronic device of claim 14, wherein the module configured to generate the CT image is further configured to reconstruct the registration data by applying predetermined transformation parameters, to extract a metal region from the registration data, and to set the sinogram surgery region to correspond to the metal region.

16. The electronic device of claim 14, wherein the module configured to generate the CT image is further configured to segment the registration data into connected regions surrounding the metal region, to compute the average attenuation coefficients of the each connected region, and to fill in each connected regions using the average attenuation coefficients.

17. The electronic device of claim 10, wherein the registration module is further configured to find the parameters for registering CAD volume into CT volume data using a particle swarm optimization (PSO) algorithm.

* * * * *